United States Patent

[19]

Etzbach et al.

[11] Patent Number: 6,152,968

[45] Date of Patent: Nov. 28, 2000

[54] WATER-SOLUBLE QUINACRIDONES

[75] Inventors: Karl-Heinz Etzbach, Frankenthal; Carolin Kranz, Heppenheim; Rüdiger Sens, Ludwigshafen, all of Germany

[73] Assignee: BASF Aktiengesellschaft, Ludwigshafen, Germany

[21] Appl. No.: 09/380,615

[22] PCT Filed: Mar. 9, 1998

[86] PCT No.: PCT/EP98/01353

§ 371 Date: Sep. 17, 1999

§ 102(e) Date: Sep. 17, 1999

[87] PCT Pub. No.: WO98/41582

PCT Pub. Date: Sep. 24, 1988

[30] Foreign Application Priority Data

Mar. 19, 1997 [DE] Germany ............................ 197 11 443

[51] Int. Cl.[7] .............................. C09B 48/00; D06P 1/40
[52] U.S. Cl. ..................... 8/638; 8/919; 8/445; 8/499; 564/49; 564/56; 564/57
[58] Field of Search ................. 564/49; 546/56, 546/57; 106/497, 22 H, 637.1; 8/638, 919

[56] References Cited

U.S. PATENT DOCUMENTS 3,386,843  6/1968  Jaffe et al. .

FOREIGN PATENT DOCUMENTS

| 39-11765 | 6/1964 | Japan . |
| 46-10069 | 3/1971 | Japan . |
| 50-04019 | 2/1975 | Japan . |
| 10095946 | 4/1998 | Japan . |

OTHER PUBLICATIONS

B. Smith, et al., Text. Chem. Color, vol. 15, No. 8, pps. 23–29, "Ink Jet Printing For Textiles", Aug. 1987.

L.A. Graham, Text. Chem Color, vol. 21, No. 6, pps. 27–32, "Ink Jet Systems For Dyeing and Printing of Textiles", Jun. 1989.

*Primary Examiner*—Margaret Einsmann
*Attorney, Agent, or Firm*—Oblon, Spivak, McClelland, Maier & Neustadt, P.C.

[57] ABSTRACT

The use of water-soluble quinacridones of the formula I $$(\oplus M \ ^\ominus O_3S)_m \text{—[quinacridone core with } R^1, R^2, R^3, R^4\text{]—}(SO_3^\ominus \ M^\oplus)_n,$$ (I)

where $M^\oplus$ is a lithium, sodium, potassium or ammonium cation, $R^1$, $R^2$, $R^3$ and $R^4$ independently are hydrogen, $C_1$–$C_8$-alkyl, $C_1$–$C_8$-alkoxy, carboxyl, $C_1$–$C_4$-alkoxycarbonyl, sulfamoyl, mono- or di-($C_1$–$C_4$)-alkylsulfamoyl, carbamoyl, mono- or di-($C_1$–$C_4$)-alkylcarbamoyl, unsubstituted or substituted mono- or diphenylsulfamoyl, unsubstituted or substituted mono- or diphenylcarbamoyl, halogen, nitro or cyano, n is 0, 1 or 2 and m is 0, 1 or 2 and the sum n+m is at least 1, for dyeing and printing natural and synthetic fiber material.

10 Claims, No Drawings

WATER-SOLUBLE QUINACRIDONES

The present invention provides for the use of water-soluble quinacridones of the formula I

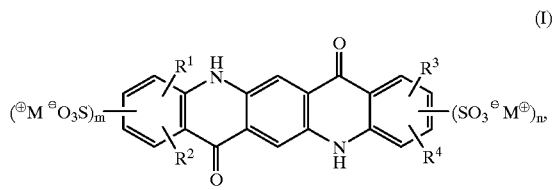

where
$M^\oplus$ is a lithium, sodium, potassium or ammonium cation,
$R^1, R^2, R^3$ and $R^4$ independently are hydrogen, $C_1$–$C_8$-alkyl, $C_1$–$C_8$-alkoxy, carboxyl, $C_1$–$C_4$-alkoxycarbonyl, sulfamoyl, mono- or di-$(C_1$–$C_4)$-alkylsulfamoyl, carbamoyl, mono- or di-$(C_1$–$C_4)$-alkylcarbamoyl, unsubstituted or substituted mono- or diphenylsulfamoyl, unsubstituted or substituted mono- or diphenylcarbamoyl, halogen, nitro or cyano,
n is 0, 1 or 2 and
m is 0, 1 or 2 and the sum n+m is at least 1,
for dyeing and printing natural and synthetic fiber material, and provides recording liquids comprising them. The invention also relates to soluble quinacridones with an ammonium cation.

JP-A 5 004 019 and JP-A 46 010 069 disclose pigment mixtures containing salts of primary, secondary or tertiary amines of sulfonated quinacridones.

Furthermore, U.S. Pat. No. 3,386,843 describes the sodium salt of sulfonated quinacridone as a precursor in the preparation of aluminum quinacridonesulfonic acids.

These salts are employed as crystallization disruptors for quinacridone pigments in order to improve their dispersing properties.

JP-A 05 222 328 discloses quinacridones having 2-carboxybenzoylaminomethylene substituents in mixtures of colorants for inkjet printing.

The use of quinacridone pigments in graphic inks and printing inks is generally known but in general is hampered by the problem of unstable colorant mixtures. This can lead to the deposition of solid substances and thus to the blockage of nozzles, which often totally rules out the use of quinacridone pigments in recording liquids such as inks.

If soluble colorants, ie. dyes, instead are used in inks, then the wet fastness of the resultant prints is usually inadequate.

It is an object of the present invention, therefore, to provide inkjet coloring techniques with colorants which solve the problems of the prior art.

We have found that this object is achieved by the use of the water-soluble quinacridones defined at the outset for dyeing and printing natural and synthetic fiber material, especially for the pulp dyeing of paper and for inkjet printing processes.

The quinacridones have up to four, preferably three, two or one sulfo group in anion form. Particular preference is given to quinacridones having two sulfo groups.

Suitable cations $M^\oplus$ are lithium, sodium, potassium or, preferably, ammonium ions. For the purposes of the invention, ammonium ions can be substituted or unsubstituted ammonium cations. The former include monoalkyl-, dialkyl-, trialkyl-, tetraalkyl- or benzyltrialkylammonium cations or those cations derived from nitrogen-containing 5- or 6-membered saturated heterocycles. Alkyl is generally straight-chain or branched $C_1$–$C_{20}$-alkyl which can be substituted by 1 or 2 hydroxyls and/or interrupted by 1 to 4 oxygens in ether function. Where the ammonium ions have one or more alkyls, the latter can be identical or different.

Particular mention may be made of mono-$C_1$–$C_6$-alkylammonium, di-$(C_1$–$C_6$-alkyl)ammonium, tri-$(C_1$–$C_6$-alkyl)ammonium, tetra-$(C_1$–$C_6$-alkyl)ammonium, benzyltri-$(C_1$–$C_6$-alkyl)ammonium, pyrrolidinium, piperidinium, morpholinium, piperazinium or N-$(C_1$–$C_4$-alkyl)piperazinium ions.

Suitable amines from which the ammonium ions are derived are, for example:

monoalkylamines, such as methylamine, ethylamine, propylamine, isopropylamine, butylamine, sec-butylamine, isobutylamine, 1,2-dimethylpropylamine or 2-ethylhexylamine, dialkylamines, such as dimethylamine, diethylamine, dipropylamine, diisopropylamine, dibutylamine, diisobutylamine, di-sec-butylamine, bis-(2-ethylhexyl)amine, N-methyl-n-butylamine or N-ethyl-n-butylamine, alkoxyalkylamines, such as 2-methoxyethylamine, bis-2-methoxyethylamine, 3-methoxypropylamine, 3-ethoxypropylamine or 3-(2-ethylhexoxy)propylamine, trialkylamines, such as trimethylamine, triethylamine, tri-n-propylamine, tributylamine, N,N-dimethylethylamine, N,N-dimethylisopropylamine, N,N-dimethylbenzylamine and hydroxyamines, such as mono- or diethanolamine, mono- or dipropanolamine, mono- or diisopropanolamine, N-mono- or N,N-di-$(C_1$–$C_4$-alkyl)ethanolamines, -propanolamines or -isopropanolamines, such as N-mono- or N,N-dimethylethanolamine, -propanolamine or -isopropanolamine, N-mono- or N,N-diethylethanolamine, -propanolamine or -isopropanolamine, N-mono- or N,N-dipropylethanolamine, -propanolamine or -isopropanolamine, N-mono- or N,N-diisopropylethanolamine, -propanolamine or -isopropanolamine or N-mono- or N,N-dibutylethanolamine, -propanolamine or -isopropanolamine, N-$(C_1$–$C_4$-alkyl)diethanolamines, -dipropanolamines or -diisopropanolamines, such as N-methyldiethanolamine, -dipropanolamine or -diisopropanolamine, N-ethyldiethanolamine, -dipropanolamine or -diisopropanolamine, N-propyldiethanolamine, -dipropanolamine or -diisopropanolamine, N-isopropyldiethanolamine, -dipropanolamine or -diisopropanolamine or N-butyldiethanolamine, -dipropanolamine or -diisopropanolamine, triethanolamine, tripropanolamine, triisopropanolamine, N-(2-hydroxyethyl)pyrrolidine, N-(2- or 3-hydroxypropyl)pyrrolidine, N-(2-hydroxyethyl)piperidine, N-(2- or 3-hydroxypropyl)piperidine, N-(2-hydroxyethyl)morpholine, N-(2- or 3-hydroxypropyl)morpholine, N-(2-hydroxyethyl)piperazine, N-(2- or 3-hydroxypropyl)piperazine or N,N-dimethyl- or N,N-diethyl-N-(5-hydroxy-3-oxapentyl)amine.

Examples of $R^1, R^2, R^3$ and $R^4$ are methyl, ethyl, propyl, isopropyl, butyl, isobutyl, sec-butyl, tert-butyl, pentyl, isopentyl, neopentyl, tert-pentyl, hexyl, 2-methylpentyl, heptyl, 1-ethylpentyl, octyl, 2-ethylhexyl, isooctyl (the above designation isooctyl is a trivial name and derives from the alcohols obtained by oxo synthesis—cf. in this respect Ullmann's Encyclopedia of Industrial Chemistry, 5th Edition, Vol. A 1, pages 290 to 293, and also Vol. A 10, pages 284 and 285), methoxy, ethoxy, propoxy, isopropoxy, butoxy, isobutoxy, sec-butoxy, tert-butoxy, methoxycarbonyl, ethoxycarbonyl, propoxycarbonyl, isopropoxycarbonyl, butoxycarbonyl, isobutoxycarbonyl, sec-butoxycarbonyl, tert-butoxycarbonyl, mono- or dimethylsulfamoyl, mono- or diethylsulfamoyl, mono- or dipropylsulfamoyl, mono- or dibutylsulfamoyl, mono- or dimethylcarbamoyl, mono- or diethylcarbamoyl, mono- or dipropylcarbamoyl, mono- or dibutylcarbamoyl, fluorine, chlorine and bromine.

$R^1$, $R^2$, $R^3$ and $R^4$ can also be substituted mono- or diphenylsulfamoyl and mono- or diphenylcarbamoyl whose phenyl(s) carries (carry) preferably two, three or, in particular, one substituent(s) from the group consisting of nitro, cyano, $C_1$–$C_4$-alkoxycarbonyl and carboxyl.

The quinacridones of the formula I preferably carry substituents $R^1$, $R^2$, $R^3$ and $R^4$ from the group consisting of $C_1$–$C_4$-alkyl, $C_1$–$C_4$-alkoxy, chlorine, sulfamoyl, mono- and di-($C_1$–$C_4$)-alkylsulfamoyl and mono- and diphenylsulfamoyl.

Particular preference is given to quinacridones of the formula I in which $R^2$ and $R^4$ are hydrogen.

Preference is also given to quinacridones of the formula I in which $R^3=R^1$ and $R^4=R^2$.

Preference is given to quinacridones of the formula I in which n and m are each 1.

The preparation of quinacridonesulfonic acids is known and is described in U.S. Pat. No. 3,386,843. Consequently, the alkali metal salts are readily obtainable by reacting the acids with the corresponding alkali metal hydroxides. Likewise starting from the acids, this time by reaction with primary, secondary or tertiary amines or quaternary ammonium salts, the ammonium salts can be obtained. This reaction can be carried out in water and in polar organic solvents such as methanol, ethanol, acetone or dimethylformamide, for example.

The novel ammonium salts of the general formula I, where $M^\oplus$ is $NH_4^\oplus$, are obtained, for example, by reacting the quinacridone-sulfonic acids with a concentrated aqueous ammonia solution, advantageously at room temperature.

It has been found that the water-soluble quinacridones I are suitable for dyeing and printing natural and synthetic fiber material such as cotton, wool or nylon. They are particularly preferred for use in the pulp dyeing of paper and in the inkjet printing process.

The pulp dyeing of paper is preferably employed with sized or unsized paper.

In the inkjet printing process the inks used are usually aqueous inks which are sprayed in small droplets directly onto the substrate. A distinction is made here between a continuous process, in which the ink is pressed uniformly through a nozzle and is guided onto the substrate by means of an electrical field depending on the pattern to be printed, and an interrupted inkjet, or drop-on-demand process, where the ink is ejected only where a colored dot is to appear. In the latter process, pressure is exerted on the ink system by way of either a piezoelectric crystal or a heated hollow needle (bubblejet or thermal jet process) and so one drop of ink is expelled. Techniques of this kind are described, for example, in Text. Chem. Color, Volume 19 (8), 1987, pages 23 to 29 and Volume 21 (6), 1989, pages 27 to 32.

The dyeings or prints obtained in this process feature particularly good wet fastness and abrasion fastness. They are resistant not only to water but also to milk, soapy water, sodium chloride solution, fruit juices, sweetened mineral waters and alcoholic drinks. The inks and recording liquids comprising these dyes have outstanding stability on storage and produce printed images of high definition, brightness and fastness. Even during storage of the inks and recording liquids there is no deposition, which can lead to blockage of nozzles or to printed images lacking in definition.

The present invention also provides mixtures, for example recording liquids, comprising the quinacridones of the formula I. These recording liquids may include either only dissolved dyes or else pigments as well, for example C.I. Pigment Violet 19 or C.I. Pigment Red 122. Recording liquids are prepared by methods known per se. The recording liquids generally contain a total of from 0.5 to 15% by weight of one or more dyes of the formula I, from 0 to 99% by weight of water and from 0.5 to 99.5% by weight of a water-soluble organic solvent, the sum of all the components being 100. Examples of suitable solvents are mono- and polyhydric alcohols, their ethers and esters.

Examples of suitable solvents are ethanol, propanol, isopropanol, butanol, isobutanol and tert-butanol; dihydric and trihydric alcohols, especially those having from 2 to 6 carbons, examples being ethylene glycol, propylene glycol, 1,3-propanediol, 1,4-butanediol, 1,5-pentanediol, 1,6-hexanediol, 1,2,6-hexanetriol, glycerol, diethylene glycol, dipropylene glycol; polyalkylene glycols, for example triethylene glycol, polyethylene glycol, tripropylene glycol, polypropylene glycol; lower alkyl ethers of polyhydric alcohols, for example ethylglycol monomethyl or monoethyl or monopropyl or monobutyl ether, diethylene glycol monomethyl or monoethyl ether, triethylene glycol monomethyl or monoethyl ether; ketones and keto alcohols, especially those having from 3 to 7 carbon atoms, such as acetone, methyl ethyl ketone, diethyl ketone, methyl isobutyl ketone, methyl pentyl ketone, cyclopentanone, cyclohexanone, diacetone alcohol; ethers, for example dibutyl ether, tetrahydrofuran, dioxane; esters, for example ethyl formate, methyl formate, methyl acetate, ethyl acetate, propyl acetate, butyl acetate, phenyl acetate, ethylene glycol monoethyl ether acetate, 2-hydroxyethyl acetate; amides, for example dimethylformamide, dimethylacetamide, N-methylpyrrolidone; and also urea, tetramethylurea and thiodiglycol.

The recording liquids may also comprise customary additives, examples being preservatives, such as phenol derivatives, cationic, anionic or nonionic surface-active substances (wetting agents), and also viscosity regulators, for example polyvinyl alcohol, cellulose derivatives, sugar derivatives or water-soluble natural or synthetic resins as film formers and/or binders for increasing the adhesive strength and abrasion resistance.

Amines, such as ethanolamine, diethanolamine, triethanolamine, N,N-dimethylethanolamine and diisopropylamine, for example, serve primarily to raise the pH of the recording liquid. They are generally present in proportions of from 0 to 10% by weight, preferably from 0.5 to 5% by weight, in the recording liquid.

In the case of recording liquids for the inkjet printing process, and depending on the particular embodiment of this process, for example continuous jet, intermittent jet, impulse jet or compound jet processes, it may be appropriate to add further additives, for example for buffering the pH or for adjusting the electrical conductivity, specific heat or coefficient of thermal expansion.

The recording liquids can be prepared simply by mixing the components, for example by dissolving one or more dyes of the formula I in water and/or solvent or else by diluting an aqueous solution obtained in the preparation of the dye of formula I, possibly after appropriate preparation, to the desired extent and then adding further components, such as water, solvents, additives, etc.

The recording liquids comprising one or more dyes of the formula I are outstandingly suited to use in printing, copying, marking, writing, drawing, stamping or recording processes, including in particular the inkjet printing process.

The application also embraces novel quinacridones of the formula II

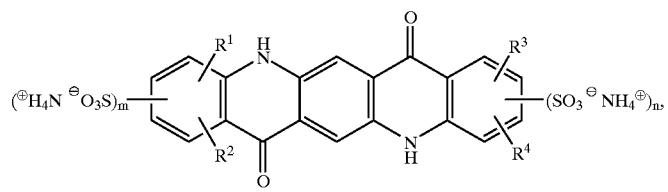

where $R^1$, $R^2$, $R^3$, $R^4$, m and n are as defined in claim 1 and the sum of n+m is at least 1.

$R^1$, $R^2$, $R^3$ and $R^4$ are preferably as already defined for the quinacridones of the formula I. Similarly, the same preferences apply to the quinacridones II.

The novel quinacridones are suitable for the dyeing and printing of natural and synthetic fiber material. The present invention likewise embraces mixtures comprising quinacridones of the formula II, especially recording liquids.

Preparing the dyes

EXAMPLE 1

14.6 g of the diphenylaminoterephthalic acid derivative described in U.S. Pat. No. 3,386,843

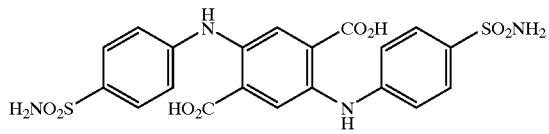

were introduced with stirring into 292 g of polyphosphoric acid and then the mixture was heated at 160° C. for 6 hours. Subsequently, it was cooled and the violet solution was precipitated in 1000 ml of ice-cold methanol. The resulting precipitate was filtered off with suction, washed with methanol and dried. The resulting 2,9-quinacridonedisulfonic acid was stirred at room temperature for 2 hours with 50 ml of concentrated aqueous ammonia solution. The bisammonium salt was then precipitated by adding acetone and was isolated. For additional purification, it was again dissolved in a little water and precipitated with acetone. Drying gave 8.1 g of the compound of the formula

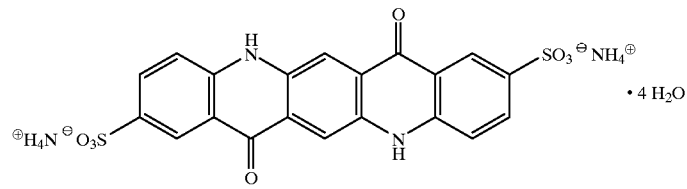

Analysis: $C_{20}H_{26}O_{12}N_4S_2$, MW 578.6

|  | C | H | O | N | S |
|---|---|---|---|---|---|
| Calc. | 41.52 | 4.53 | 33.18 | 9.68 | 11.08 |
| Found | 41.6 | 4.2 | 32.5 | 10.0 | 10.8 |

$UV(H_2O)$: $\lambda$: 532 nm ($\epsilon$: 5800), 502 nm ($\epsilon$: 6430)

The alkali metal salts and other ammonium salts were prepared analogously by neutralizing the quinacridonedisulfonic acid with alkali metal hydroxides or amines. The reaction can be carried out in water or in organic solvents such as methanol, ethanol, acetone or DMF, for example.

EXAMPLE 2

The disodium salt of 2,9-quinacridonedisulfonic acid, prepared in accordance with U.S. Pat. No. 3,386,843, was purified by dissolving it twice in the minimum amount of water and then precipitating it with ethanol.

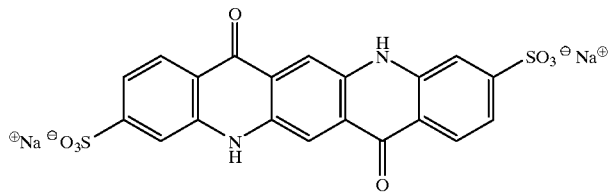

UV(H₂O): λ: 528 nm (ε: 4480), 498 nm (ε: 4980)

USE EXAMPLE

A 3% strength by weight solution comprising 0.3 g of the dye prepared in Example 1 and 9.7 g of a 10% strength by weight aqueous solution of N-methylpyrrolidone was prepared by stirring the mixture at room temperature for 2 hours.

The resulting ink was then used for printing with an inkjet printer in accordance with the bubble-jet technique.

The prints obtained had good applications-related properties.

We claim:

1. A method of dyeing and printing a natural or synthetic fiber material, comprising:

contacting the fiber material with a water-soluble quinacridone represented by formula I:

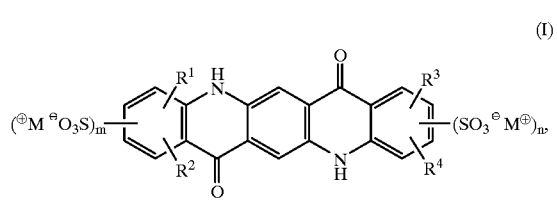

wherein $M^{\oplus}$ is a lithium, sodium, potassium or ammonium cation, $R^1$, $R^2$, $R^3$ and $R^4$ are, independently, hydrogen, $C_1$–$C_8$-alkyl, $C_1$–$C_8$-alkoxy, carboxyl, $C_1$–$C_4$-alkoxycarbonyl, sulfamoyl, mono- or di-($C_1$–$C_4$)-alkylsulfamoyl, carbamoyl, mono- or di-($C_1$–$C_4$)-alkylcarbamoyl, unsubstituted or substituted mono- or diphenylsulfamoyl, unsubstituted or substituted mono- or diphenylcarbamoyl, halogen, nitro or cyano, n is 0, 1 or 2, m is 0, 1 or 2, and the sum n+m is at least 1.

2. The method of claim 1, wherein $M^{\oplus}$ is an unsubstituted ammonium cation.

3. The method of claim 1, which is an inkjet printing process.

4. The method of claim 1, comprising the pulp dyeing of paper.

5. A mixture, comprising:

0–99% by weight of water, 0.5–99.5% by weight of a water-soluble organic solvent, and 0.5–15% by weight of a quinacridone represented by formula I:

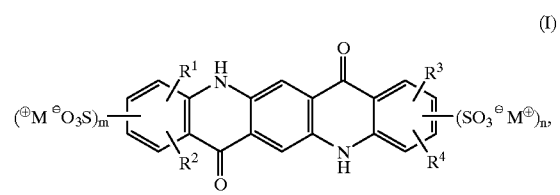

wherein $M^{\oplus}$ is a lithium, sodium, potassium or an unsubstituted ammonium cation, $R^1$, $R^2$, $R^3$ and $R^4$ are, independently, hydrogen, $C_1$–$C_8$-alkyl, $C_1$–$C_8$-alkoxy, carboxyl, $C_1$–$C_4$-alkoxycarbonyl, sulfamoyl, mono- or di-($C_1$–$C_4$)-alkylsulfamoyl, carbamoyl, mono- or di-($C_1$–$C_4$)-alkylcarbamoyl, unsubstituted or substituted mono- or diphenylsulfamoyl, unsubstituted or substituted mono- or diphenylcarbamoyl, halogen, nitro or cyano, n is 0, 1 or 2, m is 0, 1 or 2, and the sum n+m is at least 1.

6. A quinacridone represented by formula II:

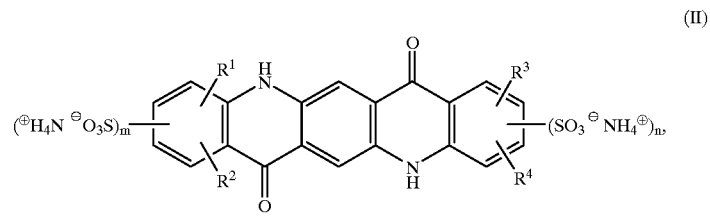

wherein $R^1$, $R^2$, $R^3$ and $R^4$ are, independently, hydrogen, $C_1$–$C_8$-alkyl, $C_1$–$C_8$-alkoxy, carboxyl, $C_1$–$C_4$-alkoxycarbonyl, sulfamoyl, mono- or di-($C_1$–$C_4$)-alkylsulfamoyl, carbamoyl, mono- or di-($C_1$–$C_4$)-alkylcarbamoyl, unsubstituted or substituted mono- or diphenylsulfamoyl, unsubstituted or substituted mono- or diphenylcarbamoyl, halogen, nitro or cyano, n is 0, 1 or 2, m is 0, 1 or 2, and the sum n+m is at least 1.

7. A mixture comprising one or more quinacridones represented by formula II as claimed in claim 6.

8. A method of ink jet printing a natural or synthetic fiber material, comprising:

contacting the fiber material with a water-soluble quinacridone represented by formula I:

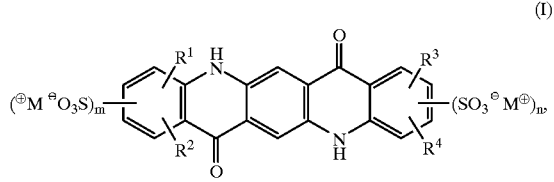

(I)

wherein $M^\oplus$ is a lithium, sodium, potassium or ammonium cation, $R^1$, $R^2$, $R^3$ and $R^4$ are, independently, hydrogen, $C_1$–$C_8$-alkyl, $C_1$–$C_8$-alkoxy, carboxyl, $C_1$–$C_4$-alkoxycarbonyl, sulfamoyl, mono- or di-$(C_1$–$C_4)$-alkylsulfamoyl, carbamoyl, mono- or di-$(C_1$–$C_4)$-alkylcarbamoyl, unsubstituted or substituted mono- or diphenylsulfamoyl, unsubstituted or substituted mono- or diphenylcarbamoyl, halogen, nitro or cyano, n is 0, 1 or 2, m is 0, 1 or 2, and the sum n+m is at least 1.

9. A method of pulp dyeing paper, comprising:

contacting the fiber material with a water-soluble quinacridone represented by formula I:

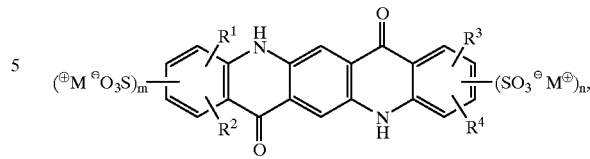

(I)

wherein $M^\oplus$ is a lithium, sodium, potassium or ammonium cation, $R^1$, $R^2$, $R^3$ and $R^4$ are, independently, hydrogen, $C_1$–$C_8$-alkyl, $C_1$–$C_8$-alkoxy, carboxyl, $C_1$–$C_4$-alkoxycarbonyl, sulfamoyl, mono- or di-$(C_1$–$C_4)$-alkylsulfamoyl, carbamoyl, mono- or di-$(C_1$–$C_4)$-alkylcarbamoyl, unsubstituted or substituted mono- or diphenylsulfamoyl, unsubstituted or substituted mono- or diphenylcarbamoyl, halogen, nitro or cyano, n is 0, 1 or 2, m is 0, 1 or 2, and the sum n+m is at least 1.

10. A quinacridone represented by formula I:

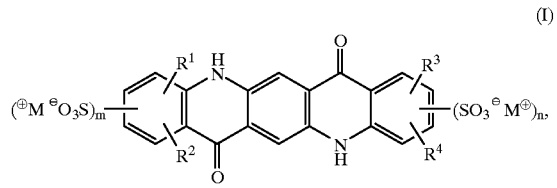

(I)

wherein $R^1$, $R^2$, $R^3$ and $R^4$ are, independently, hydrogen, $C_1$–$C_8$-alkyl, $C_1$–$C_8$-alkoxy, carboxyl, $C_1$–$C_4$-alkoxycarbonyl, sulfamoyl, mono- or di-$(C_1$–$C_4)$-alkylsulfamoyl, carbamoyl, mono- or di-$(C_1$–$C_4)$-alkylcarbamoyl, unsubstituted or substituted mono- or diphenylsulfamoyl, unsubstituted or substituted mono- or diphenylcarbamoyl, halogen, nitro or cyano, $M^+$ is lithium or potassium, n is 0, 1 or 2, m is 0, 1 or 2, and the sum n+m is at least 1.

\* \* \* \* \*